United States Patent [19]

Hutchison

[11] Patent Number: 5,042,630
[45] Date of Patent: Aug. 27, 1991

[54] CONSTANT SPEED DRIVE GEAR MOTOR DIFFERENTIAL

[75] Inventor: Richard M. Hutchison, New London, Wis.

[73] Assignee: Sundstrand Corporation, Rockford, Ill.

[21] Appl. No.: 453,772

[22] Filed: Dec. 20, 1989

[51] Int. Cl.$^5$ .............................................. F16D 31/04
[52] U.S. Cl. .................................. 192/61; 192/103 F; 475/91; 475/94
[58] Field of Search ................ 192/61, 103 F; 475/72, 475/76, 78, 84, 87, 91, 94

[56] References Cited

U.S. PATENT DOCUMENTS

| | | | |
|---|---|---|---|
| 2,659,911 | 9/1953 | Somers | 192/61 |
| 2,730,717 | 1/1956 | Bower | 192/61 |
| 2,851,908 | 9/1958 | Nakamura | 192/61 |
| 2,923,198 | 3/1960 | Crocchi | 475/72 X |
| 3,099,925 | 8/1963 | Leonard | 192/61 |
| 3,251,443 | 5/1966 | Good | 192/61 |
| 3,345,885 | 10/1967 | Tschanz | 475/72 |
| 3,896,912 | 7/1975 | Cyphelly | 192/61 |
| 3,974,900 | 8/1976 | Park | 192/103 F X |
| 4,272,993 | 6/1981 | Kopich . | |
| 4,280,375 | 7/1981 | Goscenski, Jr. . | |
| 4,630,505 | 12/1986 | Williamson . | |
| 4,924,989 | 5/1990 | Filderman | 192/103 F |

*Primary Examiner*—Allan D. Herrmann
*Assistant Examiner*—Benjamin Levi
*Attorney, Agent, or Firm*—Antonelli, Terry, Stout & Kraus

[57] ABSTRACT

A constant speed drive differential assembly (10) has an input end plate (11), a rotatable housing (17), and an output end plate (18). A gear motor (12) comprising meshing spur gears (13, 14) mounted on shafts (15, 16) are arranged in the housing (17). A driving gear (20) is fixed to one of the shafts (15 or 16) and meshes with an ouput gear (21) fixed to a cover plate (19) which is rotatable with respect to the housing (17) as a result of differential over-or-under-rotation effected by the spur gears (13, 14). A governor/speed controlled valve (28) external of the housing (17) connects a fluid source from an external pump (27) to one side (40) or the other side (41) of the meshing spur gears (13, 14) in response to an overspeed or underspeed condition of the input speed transmitted to the assembly (10).

20 Claims, 2 Drawing Sheets

CONSTANT SPEED DRIVE GEAR MOTOR DIFFERENTIAL

TECHNICAL FIELD

The present invention relates to a constant speed drive (CSD) and, more particularly, to a CSD which drives an electrical generator from the output of an engine whose shaft speed varies. The CSD has a gear motor differential which eliminates the need for several parts required in present systems and thereby reduces size and weight of the CSD.

BACKGROUND ART

In a conventional CSD, input power is taken from an input shaft and fed through a differential in which a planetary gear is driven by a combination hydraulic pump and motor known as a hydraulic log. The speed of the driven planetary gear is varied by the hydraulic log so that the output of the differential rotates at constant speed regardless of the rotational speed of the input shaft. The hydraulic log is relatively large and heavy, and is thus undesirable in applications where space and weight are at a premium.

Pumps and motors using meshing involute spur gears are well known. Pressure balanced seal plates at each end face of the gears maintain minimum contact with the rotating parts and reduce the piston action of the seals so as to reduce unnecessarily high friction, wear, heat generation and power waste. They are used, for instance, in differential gearing systems.

By way of specific examples, U.S. Pat. No. 4,272,993 shows a hydraulically controlled, limited slip differential of the type used in an automotive drive line between a transmission shaft and drive axles for each of two rear drive wheels. Typically, in such an application, the differential is provided to drive the outside wheel faster than the inside wheel during a turn. To provide in the differential a limited slip feature which ensures that both output members are driven even when there is little or no reaction force on one of the outer output members (such as when the driven wheel is on ice), this patent utilizes gear pumps in closed hydraulic circuits. The circuits are formed in internal members comprising a carrier for a bevel ring gear. Each circuit comprises a pump chamber connected to a sump. Counterrotating planet impeller gears pump fluid in the pump chambers out through a conduit into the sump and returning it to the pump chamber via another conduit. As differential speed increases, the speed of the counterrotating planet impeller gears increases, thereby pumping the fluid through the closed hydraulic circuits at a faster rate. Flow restrictors in the conduit limit the flow rate to a predetermined value and gradually limit the speed of the planet impeller gears and the differential speed of the output members to a predetermined value. Maximum allowable slip is approached smoothly and an abrupt locked condition is avoided. In this system, the fluid is all contained within the closed circuits and an internal pumping arrangement is used.

Another vehicle differential is disclosed in U.S. Pat. No. 4,280,375 wherein a slip limiting mechanism is provided in the form of an auxiliary gear drive system instead of a gear pump in a closed hydraulic circuit. The differential mechanism includes an auxiliary gear drive system for supplying additional output torque to a nonslipping output shaft when the other output shaft is slipping. A first gear set of the auxiliary gear drive system is driven at a speed dependent upon the output speed of one output shaft, a second gear set is driven at a speed dependent upon the speed of the other output shaft and a third gear set is rotated at a speed dependent upon the speed of the casing. One-way clutches selectively connect auxiliary shafts for supplying additional torque to one or the other of the outputs.

Another form of hydraulic-controlled differential is shown in U.S. Pat. No. 4,630,505 in which a case is provided with a central chamber and two side chambers for each of two driven axles. One or more pairs of meshing control gears are provided in the central chamber and form a gear pump. One of the control gears is connected to a drive gear in one side chamber, and the other control gear is connected to another drive gear in the other side chamber with hydraulic fluid provided in the chambers which are in fluid communication via spring-biased control valves.

These gear pump systems would not be particularly useful as part of a differential CSD. In particular, the closed hydraulic circuits require a relatively large and heavy case which is a substantial drawback in, for example, aircraft applications.

SUMMARY OF THE INVENTION

It is an object of the present invention to overcome the problems and disadvantages encountered in previous CSD arrangements by combining the differential gear element and the motor of a CSD hydraulic log into one component.

Another object of the present invention is the elimination of the hydraulic log used in conventional CSD arrangements, thereby saving size and weight.

Yet another object of the present invention is the simplification of a CSD differential assembly by utilizing the differential gear assembly as a motor.

The foregoing objects have been achieved by the use of a gear motor differential which uses fluid entering from an external pumping source to transfer power and control speed via a gear/pump motor differential.

A differential assembly of a constant speed drive according to the present invention comprises an input end plate, a gear motor containing meshing spur gears which are rotatably mounted on shafts in a rotatable housing, an output end plate, and a cover plate mounted on bearings for rotation relative to the output end plate. An output shaft passes through the cover plate and has an involute gear fixedly mounted at the end thereof between the output end plate and the rotatable cover plate. Another gear fixedly mounted at another end of one of the shafts in the housing to which one of the aforementioned gear motor meshing spur gears is fixedly attached meshes with the involute gear on the output shaft.

An external pump and governor/speed controlled valve complete a closed hydraulic circuit with the input end plate and with the output end plate. When the governor detects an off speed condition at the output shaft, the valve permits fluid flow to one side of the gear motor to cause rotation of the spur gears in a manner which adds speed to the output shaft. Likewise, when the governor detects an over speed condition at the output shaft, the valve permits fluid flow to the other side of the gear motor which then reduces the speed of the output shaft.

BRIEF DESCRIPTION OF THE DRAWINGS

These and other objects, features and advantages of the present invention will become more apparent from the following description when taken in conjunction with the accompanying drawings wherein.

BEST MODE FOR CARRYING OUT THE INVENTION

Figure 1:
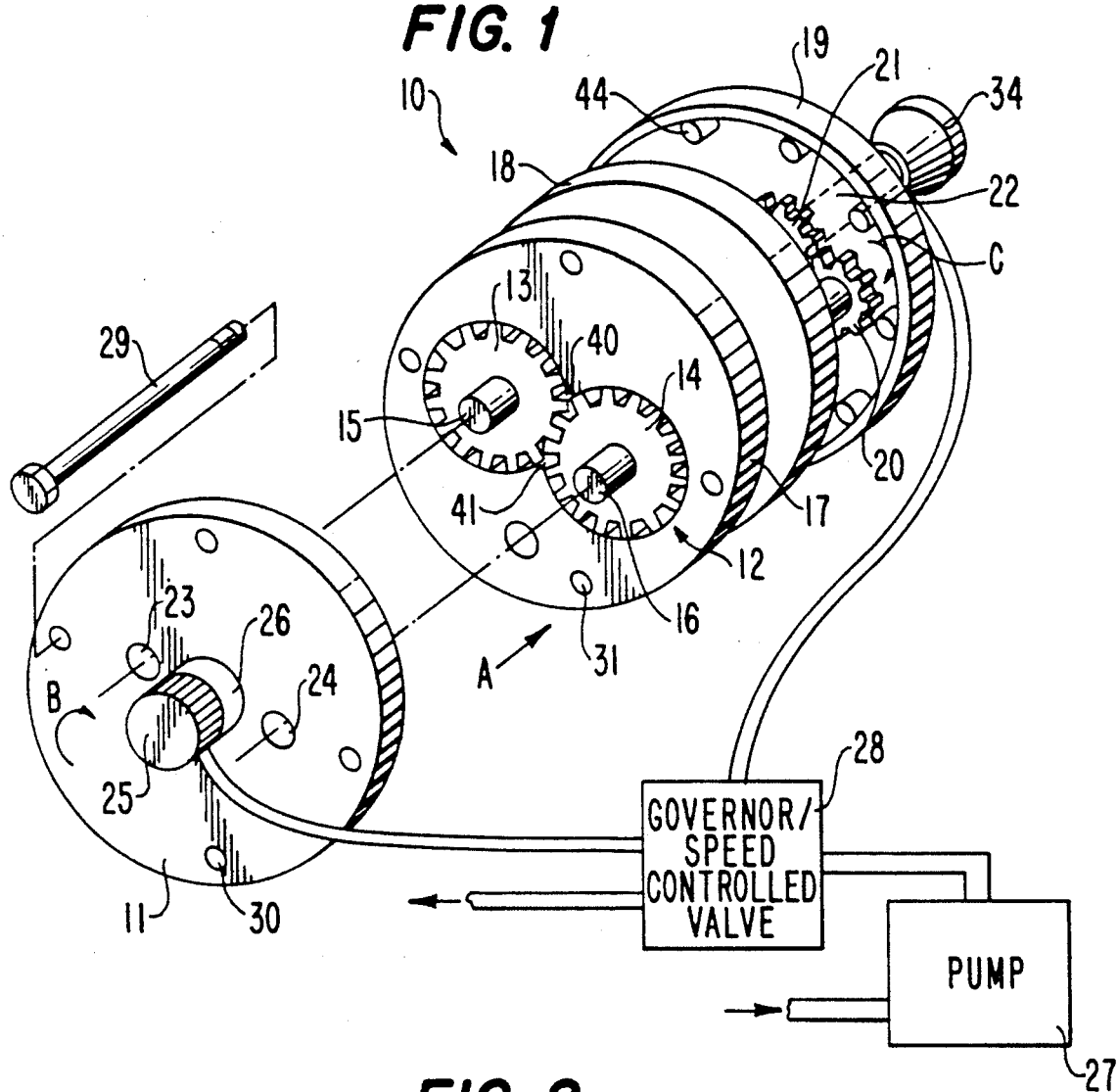
FIG. 1 is an exploded perspective view of a constant speed drive differential assembly in accordance with the present invention with the external pump and val shown schematically.

Referring now to the drawings, FIG. 1 shows a differential assembly designated generally by the numeral 10 comprising an input end plate 11, a gear motor 12 containing meshing involute spur gears 13, 14 fixedly mounted on respective rotatable shafts 15, 16 in a housing 17, an output end plate 18, and a rotatable cover plate 19. For reference, the normal rotation of the differential assembly 10 will be considered as clockwise when viewing the input end plate 11 in the direction of arrow A and is indicated by arrow B in FIG. 1. A driving gear 20 is fixedly connected to the rotatable shaft 16 upon which gear 14 is fixedly mounted and meshes with an involute output gear 21 fixed to a central portion of the cover plate 19.

Figure 2:
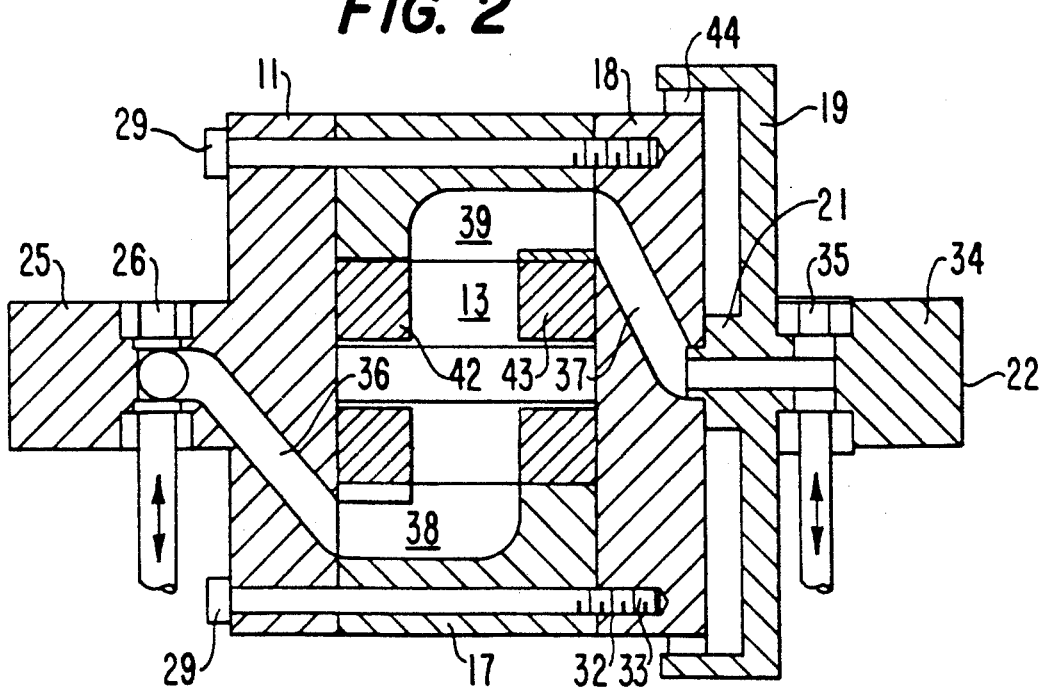
FIG. 2 is a cross sectional assembly view of the constant speed drive of FIG. 1.
Figure 3:
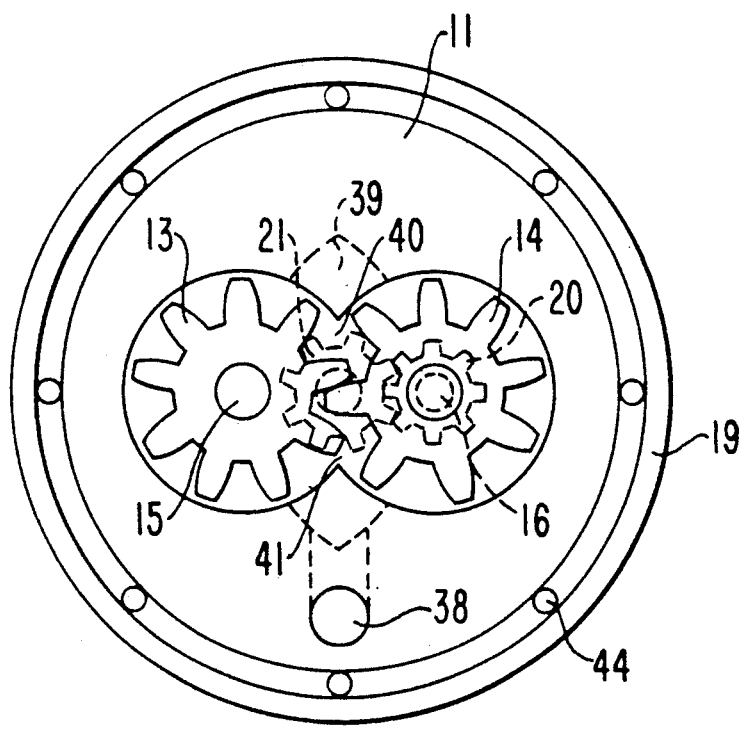
FIG. 3 is an end view of the differential housing with the input end plate removed as viewed in the direction of arrow A in FIG. 1.

The shafts 15, 16 are received in apertures 23, 24 in the input end plate 11. The differential assembly 10 is connected to a gear box of a driving source (not shown), such as an aircraft engine, through an input spline 25 fixed to the input end plate 11 with an intermediate rotary seal 26 which connects a fluid source from a pump 27 to the gear motor 12 through a governor/-speed controlled valve 28 as hereinafter described. The input end plate 11, gear motor 12 and output end plate 18 are securely held together as the differential assembly 10 shown in FIG. 2, by threaded bolts 29 which pass through mating apertures 30, 31 arranged around the circumference of the input end plate 11 and the gear motor housing 17. The output end plate 18 has apertures 32 which are the same in number as the apertures 30, 31 to threadably mate with the threaded end portions 33 of the bolts 29.

An output spline 34 is connected to the cover plate 19 through a rotary seal 35 to constitute an output shaft 22. Power from a drive source is transferred to the output spline 34 by rotation of the housing 17 and end plates 11 and 18 of the differential assembly 10 and also by rotation of the gears 13, 14 in the gear motor 12 when fluid of the necessary flow rate and pressure is pumped from a reservoir (not shown) in a closed fluid system by the pump 27 to and from the rotary seals 26, 35 through the governor/speed controlled valve 28 through passages 36, 37 in respective end plates 11, 18 and passages 38, 39 in the housing 17 of the gear motor 12.

When the governor 28 which has an associated speed controlled valve detects an off speed condition at the output spline 34, the associated valve controlled by the governor opens to allow fluid flow to the gear motor 12 through the rotary seals 26, 35 in a specified manner. In particular, in an overspeed condition, the associated valve 28 is opened to allow fluid flow to the top 40 of the gear motor 12 through rotary seal 35 into the passage 37 defining a first fluid circuit extending from a first side of the assembly in an axial direction with respect to the axis of rotation of input spline 25 and output spline 34 and a first chamber 39 so as to rotate the gears 13, 14 to turn the output drive gear 20 clockwise, as shown by the arrow C in FIG. 1, and thereby subtracting rotational speed from the output spline 34. In an underspeed condition, the valve 28 provides the required flow to the bottom 41 of the gear motor 12 through the rotary seal 26 into the passage 36 defining a second fluid circuit extending from a second side of the assembly in the axial direction and into a second chamber 38 to cause the gears 13, 14 to rotate in an opposite direction and output ring drive gear 20 to turn counterclockwise (opposite to, arrow C) and thereby adding rotational speed to the output spline 34 attached to the cover plate 19.

When the fluid is admitted into the bottom of the gear motor 12 through rotary seal 26 and passages 36, 38, the fluid will exit through the passages 39, 37 and the rotary seal 35. Conversely, when the fluid is admitted into the top of the gear motor 12 through the rotary seal 35 and passages 37, 39, the fluid will exit through the passages 38, 36 and the rotary seal 26 back to a reservoir (not shown) of the closed fluid system controlled by the governor/valve 28. The passages 36, 38 and 37, 39 are configured to give a centrifugal boost to the fluid so as to accelerate the fluid in the housing 17 to develop a pressure head and fill the gear teeth of gears 13, 14 to improve responsiveness.

The gear motor 12 can be sized to handle certain fluid pressure to develop desired rotational speed and torque. For example, the gear motor 12 for aircraft use can be sized to develop a maximum torque of 6000 in-lb with a maximum input pressure of 3000 psi and a maximum rotational speed of 3000 rpm.

Bearings 42, 43 are provided at each face of the gears 13, 14 to maintain a leak-proof rotary seal in the gear motor 12. Roller bearings 44 are provided at spaced points between the output end plate 18 and the inner periphery of the cover plate 19 to minimize friction between the two parts as the plate 19 is rotated clockwise and counterclockwise relative to the housing 17 in off speed conditions. The rotary seals 26, 35 have face seals of known construction on both sides to permit rotation of the input and output shafts, respectively, while preventing leakage of fluid under pressure. A standard face seal will include a cup, an anti-rotation device, a primary seal ring, an axial spring, a secondary seal, a sealing face and a mating ring.

The components in the differential assembly 10 are sized such that, for example, for a 12,000 rpm speed of the output shaft 22, the assembly 10 will rotate at 12,000 rpm and the gears 13, 14 will rotate at a speed not in excess of 3000 rpm. The greater the ability to differentially add or subtract speed, the greater the utility of the device. A gear speed of 3000 rpm represents a 25% differential ability.

While one embodiment has been shown and described in detail, it will be understood that further changes and modifications will become apparent to one skilled in this art given the foregoing teachings. For example, instead of the spur gears used in the gear motor, rotary vanes or a G-rotor can be considered. Therefore, it is not intended that the invention be limited to the details shown and described herein but rather that it encompass such further changes and modifications as fall within the scope of the appended claims.

I claim:

1. A constant speed drive assembly, comprising:
a rotatable housing;
meshing gears fixedly mounted on shafts in the housing so as to be rotatable relative to the housing and defining first and second fluid receiving chambers laterally of the area in which the gears mesh with each other;
an input member operatively associated with the housing for rotating the housing at a variable input speed;
an output member operatively associated with an output gear and varying in speed only in response to variation in speed of the input member;
a driving gear fixedly mounted on one of the shafts and meshing with the output gear;
means for detecting and generating a signal indicative of overspeed or underspeed conditions of the output member, and
means located externally of the housing and responsive to the signal for selectively supplying a pressurized fluid when the speed of said output member varies from a constant rate, the fluid flowing from the first chamber into contact with the meshing gears and from contact with the meshing gears into the second chamber to cause the driving gear to rotate in a first direction to subtract rotational velocity from the output member when the signal is indicative of an overspeed condition and flowing from the second chamber into contact with the meshing gears and from contact with the meshing gears into the first chamber to cause the driving gear to rotate in a second direction to add rotational velocity to the output member when the signal is indicative of an underspeed condition.

2. The assembly according to claim 1, wherein the input member includes an end plate in which the shafts are mounted, the end plate having means for communicating the pressurized fluid to one of the chambers in the housing.

3. The assembly according to claim 2, wherein the communicating means of the input member includes a rotary seal.

4. The assembly according to claim 1, wherein the input member is configured as a cover plate for one end of the housing and has a passage for providing fluid communication between one of the chambers in the housing and the supplying means.

5. The assembly according to claim 4, wherein a second end cover plate in which the shafts are mounted is provided at another end of the housing and has a passage for providing fluid communication between another of the chambers in the housing and the supplying means.

6. The assembly according to claim 5, wherein the output member has a means for communicating the pressurized fluid to the another of the chambers through a rotary seal.

7. The assembly according to claim 1, wherein the supplying means comprises a speed controlled valve responsive to the detecting means.

8. The assembly according to claim 1, wherein the shafts have axes of rotation parallel to an axis of rotation of the housing.

9. The assembly according to claim 1, wherein the meshing gears have a gear ratio causing rotation at about one fourth the rotational speed of the input member.

10. The assembly according to claim 5, wherein bearings are provided between the second end cover plate and the output member.

11. The assembly according to claim 1 wherein:
the first chamber is disposed on one side of a centerline joining axes of rotation of the meshing gears and the second chamber is disposed on another side of the centerline joining the axes of rotation; and
the supplying means includes a first fluid circuit extending from a first side of the assembly in an axial direction with respect to an axis of rotation of the members to the first chamber and a second fluid flow circuit extending from a second side of the assembly in the axial direction with respect to the axis of rotation of the members to the second chamber.

12. The assembly according to claim 2 wherein:
the first chamber is disposed on one side of a centerline joining axes of rotation of the meshing gears and the second chamber is disposed on another side of the centerline joining the axes of rotation; and
the supplying means includes a first fluid circuit extending from a first side of the assembly in an axial direction with respect to an axis of rotation of the members to the first chamber and a second fluid flow circuit extending from a second side of the assembly in the axial direction with respect to the axis of rotation of the members to the second chamber.

13. The assembly according to claim 3 wherein:
the first chamber is disposed on one side of a centerline joining axes of rotation of the meshing gears and the second chamber is disposed on another side of the centerline joining the axes of rotation; and
the supplying means includes a first fluid circuit extending from a first side of the assembly in an axial direction with respect to an axis of rotation of the members to the first chamber and a second fluid flow circuit extending from a second side of the assembly in the axial direction with respect to the axis of rotation of the members to the second chamber.

14. The assembly according to claim 4 wherein:
the first chamber is disposed on one side of a centerline joining axes of rotation of the meshing gears and the second chamber is disposed on another side of the centerline joining the axes of rotation; and
the supplying means includes a first fluid circuit extending from a first side of the assembly in an axial direction with respect to an axis of rotation of the members to the first chamber and a second fluid flow circuit extending from a second side of the assembly in the axial direction with respect to the axis of rotation of the members to the second chamber.

15. The assembly according to claim 5 wherein:
the first chamber is disposed on one side of a centerline joining axes of rotation of the meshing gears and the second chamber is disposed on another side of the centerline joining the axes of rotation; and
the supplying means includes a first fluid circuit extending from a first side of the assembly in an axial direction with respect to an axis of rotation of the members to the first chamber and a second fluid flow circuit extending from a second side of the assembly in the axial direction with respect to the axis of rotation of the members to the second chamber.

16. The assembly according to claim 6 wherein:

the first chamber is disposed on one side of a centerline joining axes of rotation of the meshing gears and the second chamber is disposed on another side of the centerline joining the axes of rotation; and the supplying means includes a first fluid circuit extending from a first side of the assembly in an axial direction with respect to an axis of rotation of the members to the first chamber and a second fluid flow circuit extending from a second side of the assembly in the axial direction with respect to the axis of rotation of the members to the second chamber.

17. The assembly according to claim 7 wherein:

the first chamber is disposed on one side of a centerline joining axes of rotation of the meshing gears and the second chamber is disposed on another side of the centerline joining the axes of rotation; and the supplying means includes a first fluid circuit extending from a first side of the assembly in an axial direction with respect to an axis of rotation of the members to the first chamber and a second fluid flow circuit extending from a second side of the assembly in the axial direction with respect to the axis of rotation of the members to the second chamber.

18. The assembly according to claim 8 wherein:

the first chamber is disposed on one side of a centerline joining axes of rotation of the meshing gears and the second chamber is disposed on another side of the centerline joining the axes of rotation; and the supplying means includes a first fluid circuit extending from a first side of the assembly in an axial direction with respect to an axis of rotation of the members to the first chamber and a second fluid flow circuit extending from a second side of the assembly in the axial direction with respect to the axis of rotation of the members to the second chamber.

19. The assembly according to claim 9 wherein:

the first chamber is disposed on one side of a centerline joining axes of rotation of the meshing gears and the second chamber is disposed on another side of the centerline joining the axes of rotation; and the supplying means includes a first fluid circuit extending from a first side of the assembly in an axial direction with respect to an axis of rotation of the members to the first chamber and a second fluid flow circuit extending from a second side of the assembly in the axial direction with respect to the axis of rotation of the members to the second chamber.

20. The assembly according to claim 10 wherein:

the first chamber is disposed on one side of a centerline joining axes of rotation of the meshing gears and the second chamber is disposed on another side of the centerline joining the axes of rotation; and the supplying means includes a first fluid circuit extending from a first side of the assembly in an axial direction with respect to an axis of rotation of the members to the first chamber and a second fluid flow circuit extending from a second side of the assembly in the axial direction with respect to the axis of rotation of the members to the second chamber.

* * * * *